Sept. 26, 1961 C. A. CHRISTOFF 3,001,697
DIFFERENTIAL ACTUATOR CONTROL
Original Filed Nov. 16, 1953 14 Sheets-Sheet 1

INVENTOR,
Chris A. Christoff
BY
ATTORNEY.

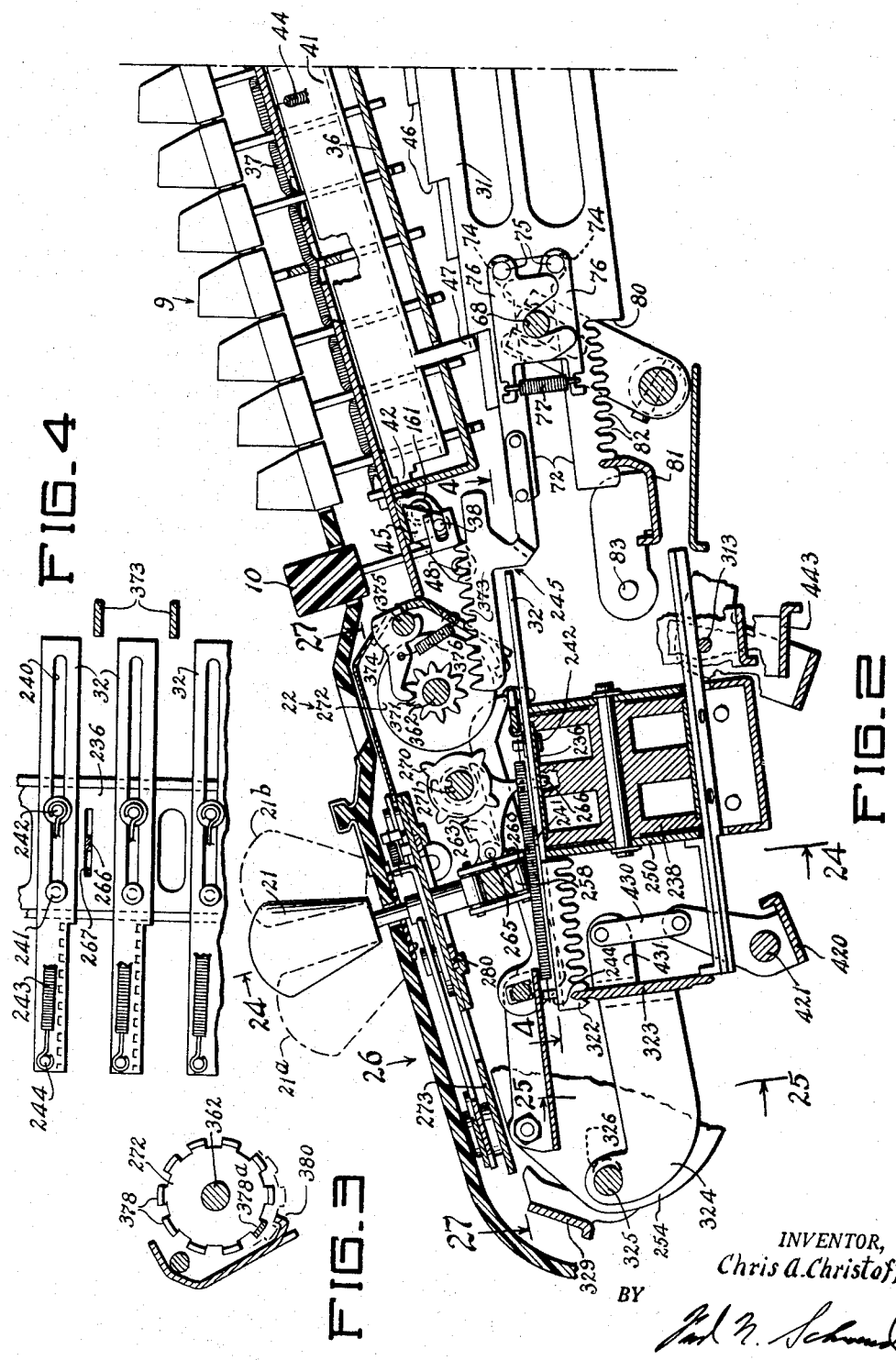

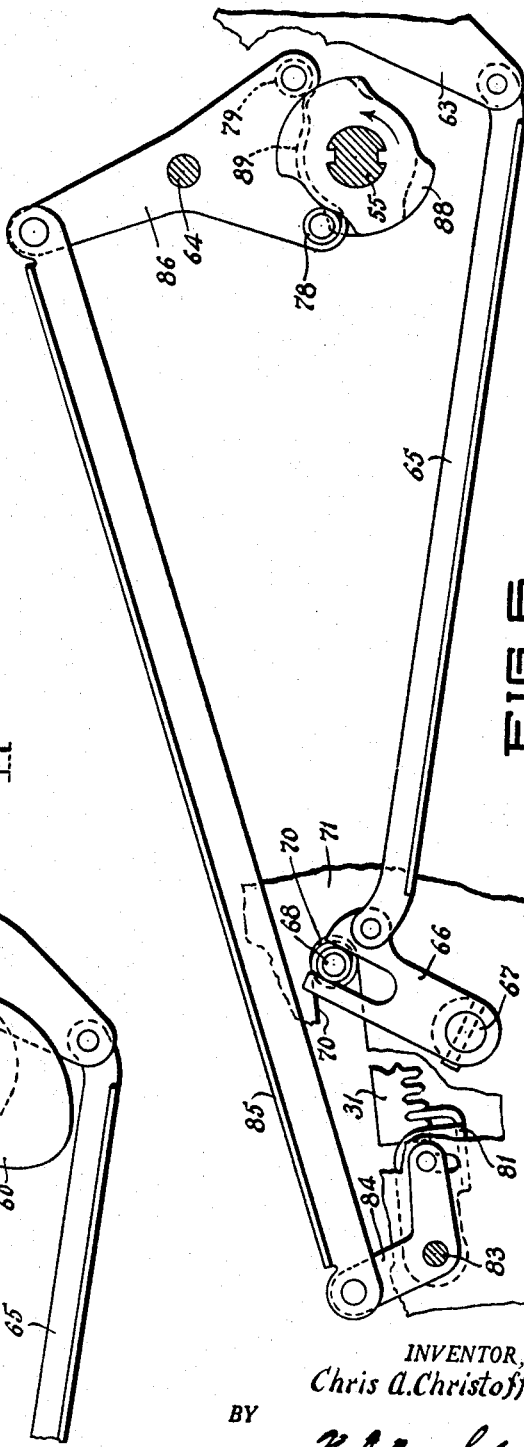

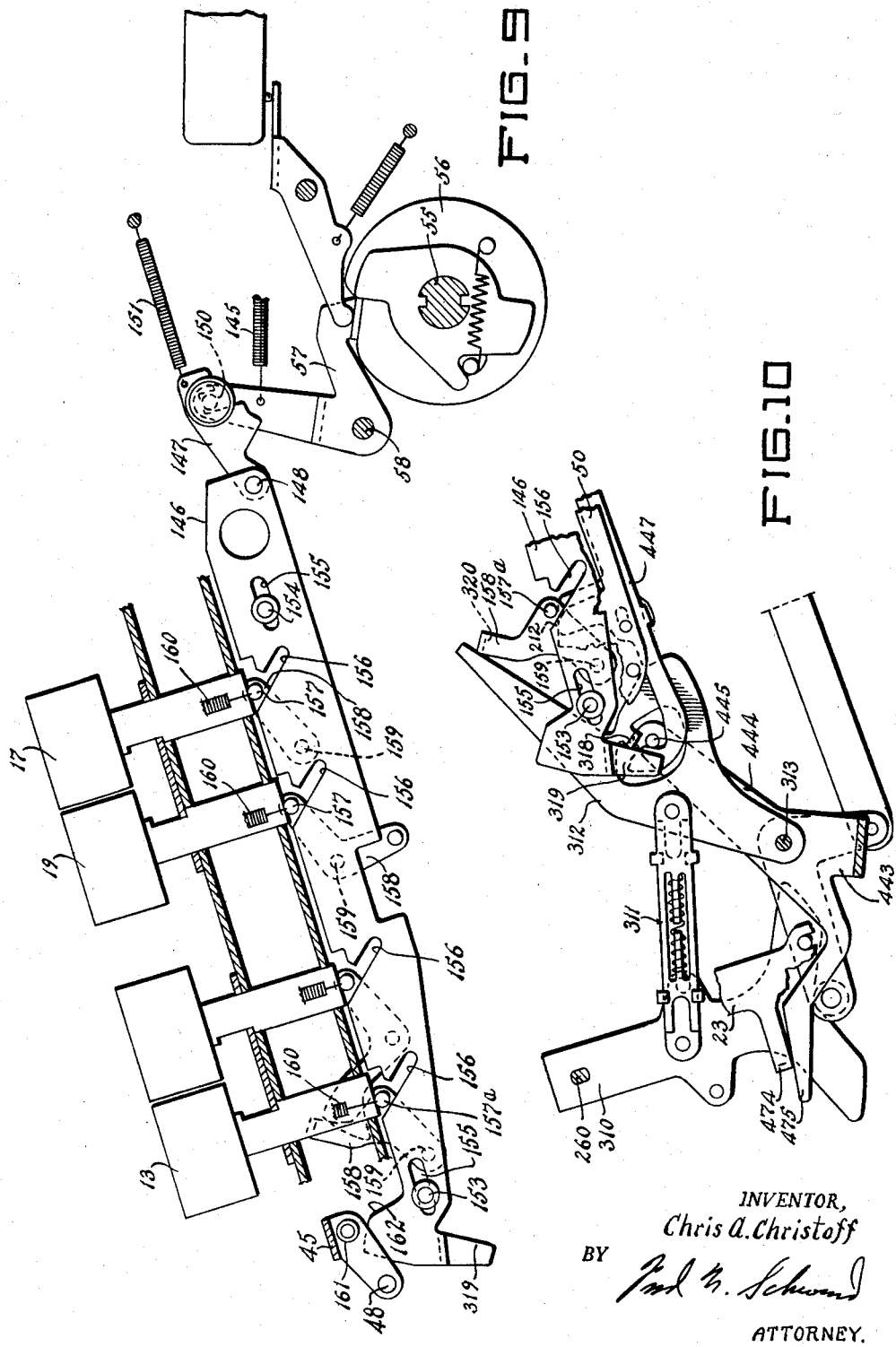

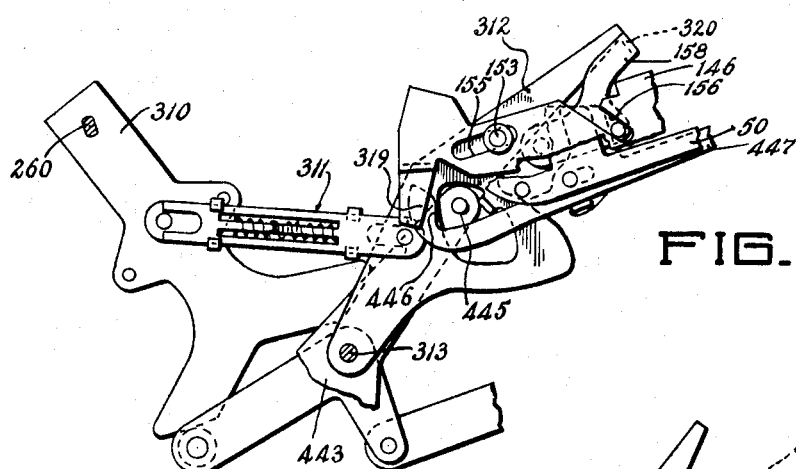
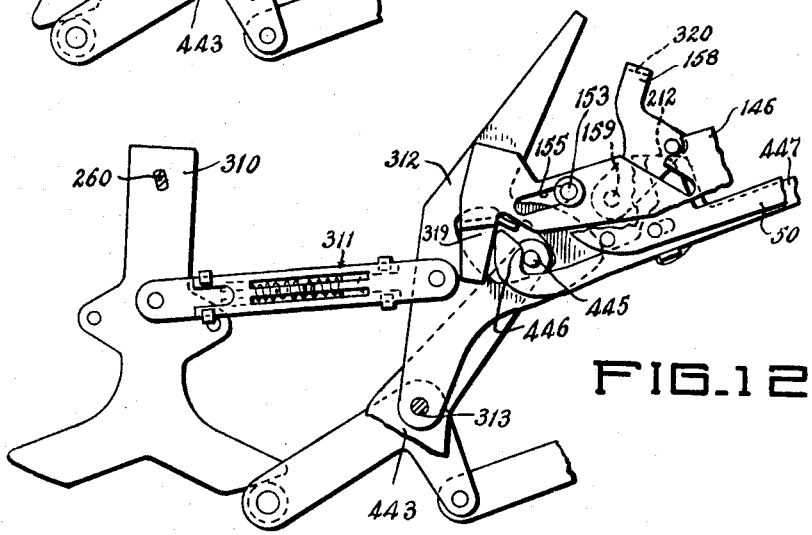
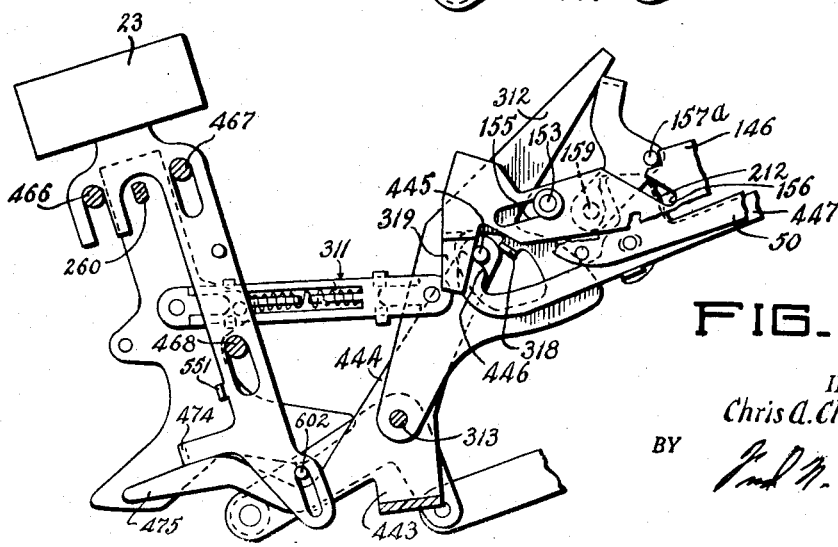

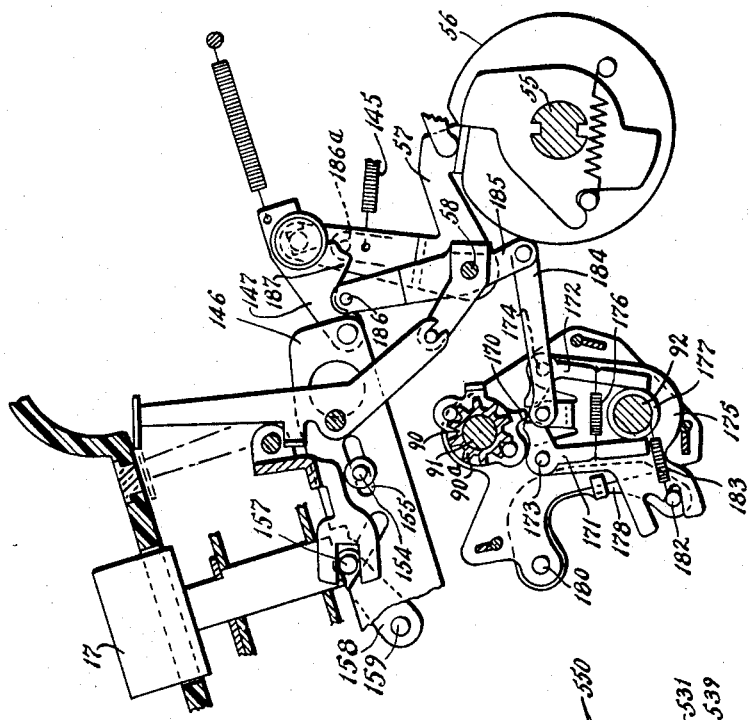
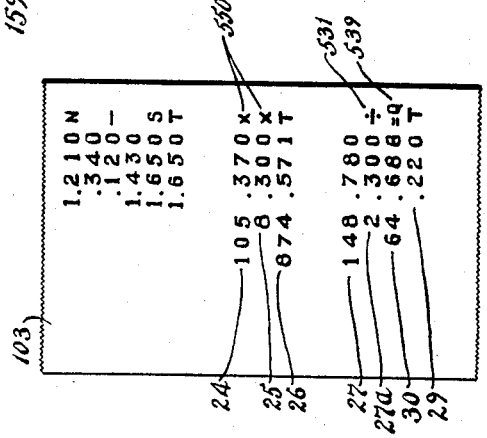
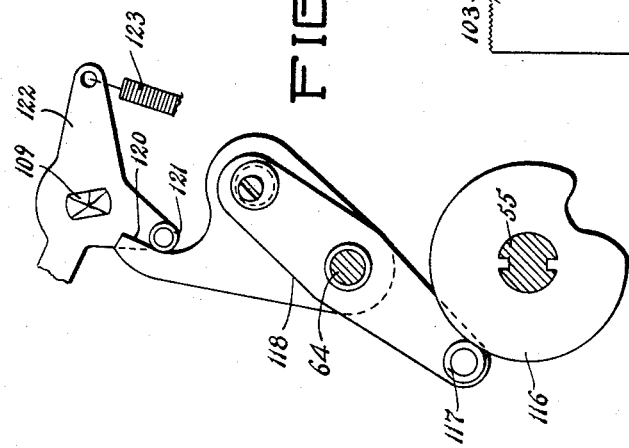

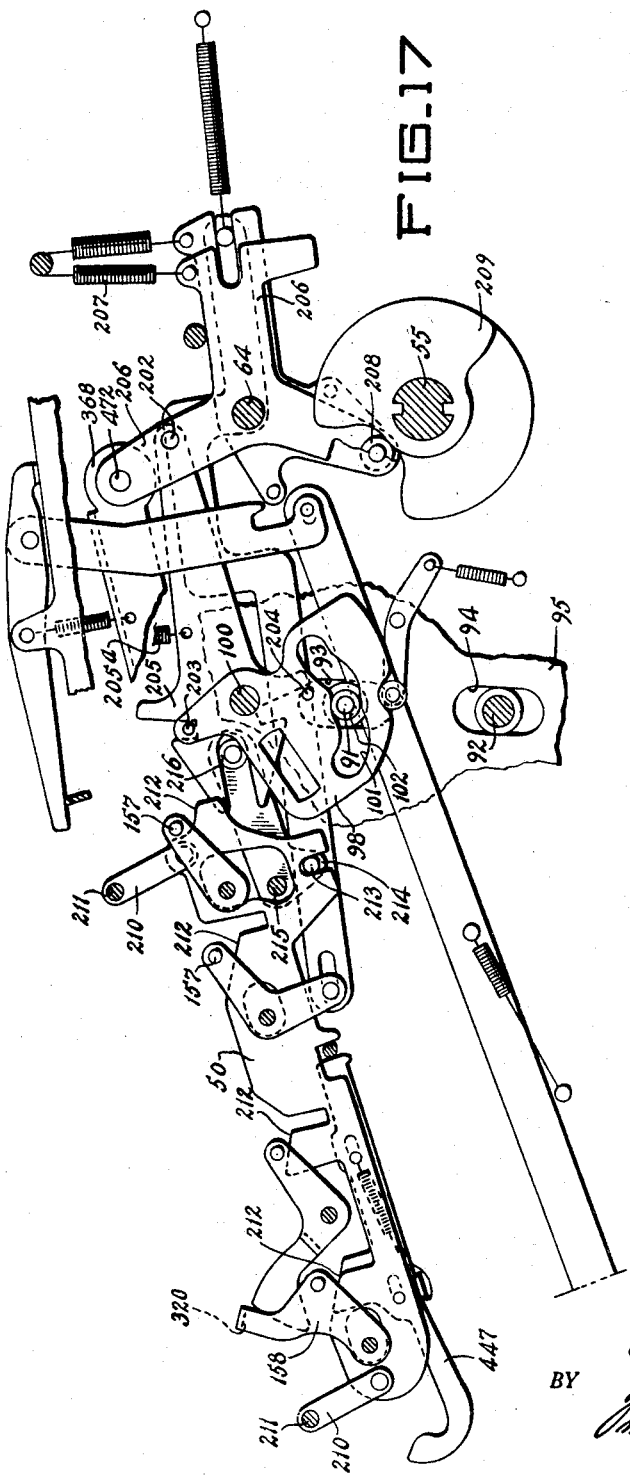

Sept. 26, 1961   C. A. CHRISTOFF   3,001,697
DIFFERENTIAL ACTUATOR CONTROL
Original Filed Nov. 16, 1953   14 Sheets-Sheet 9
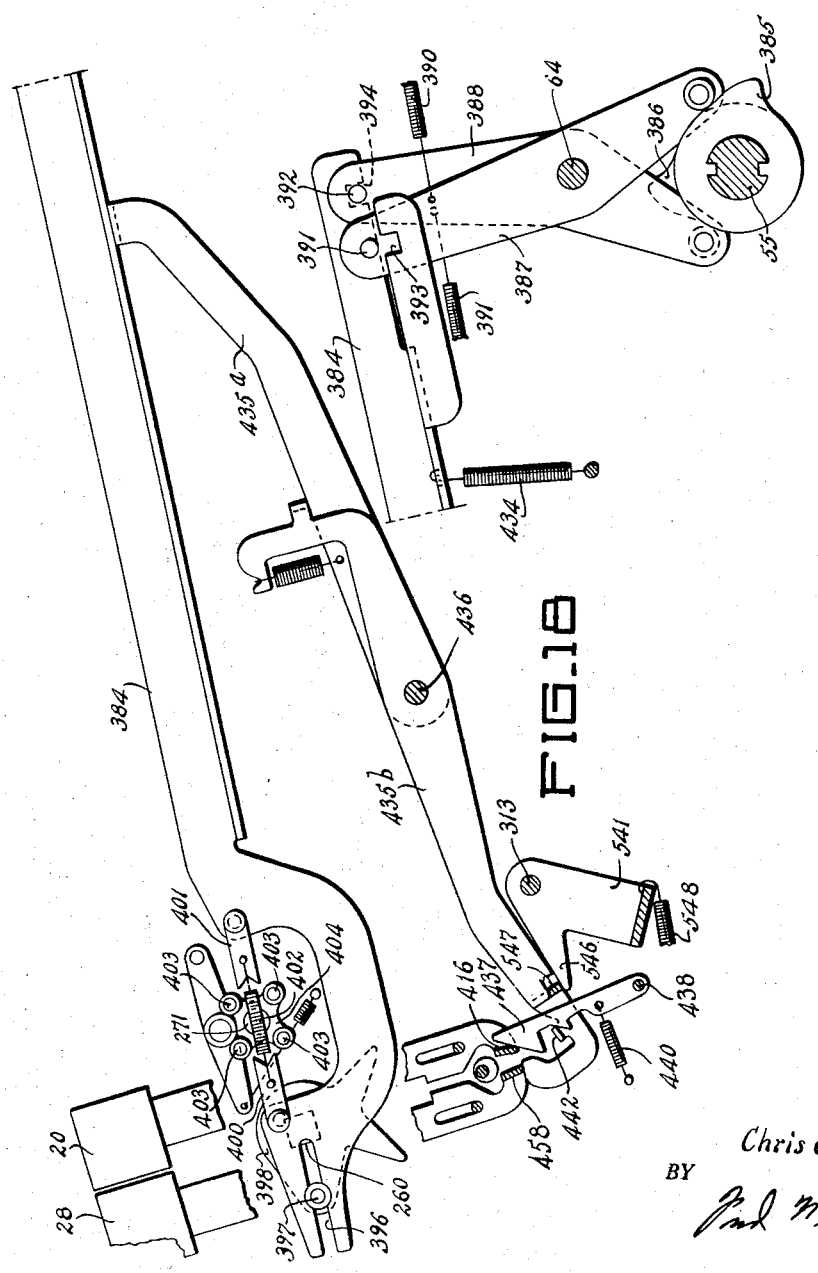
INVENTOR,
Chris A. Christoff
BY
ATTORNEY.

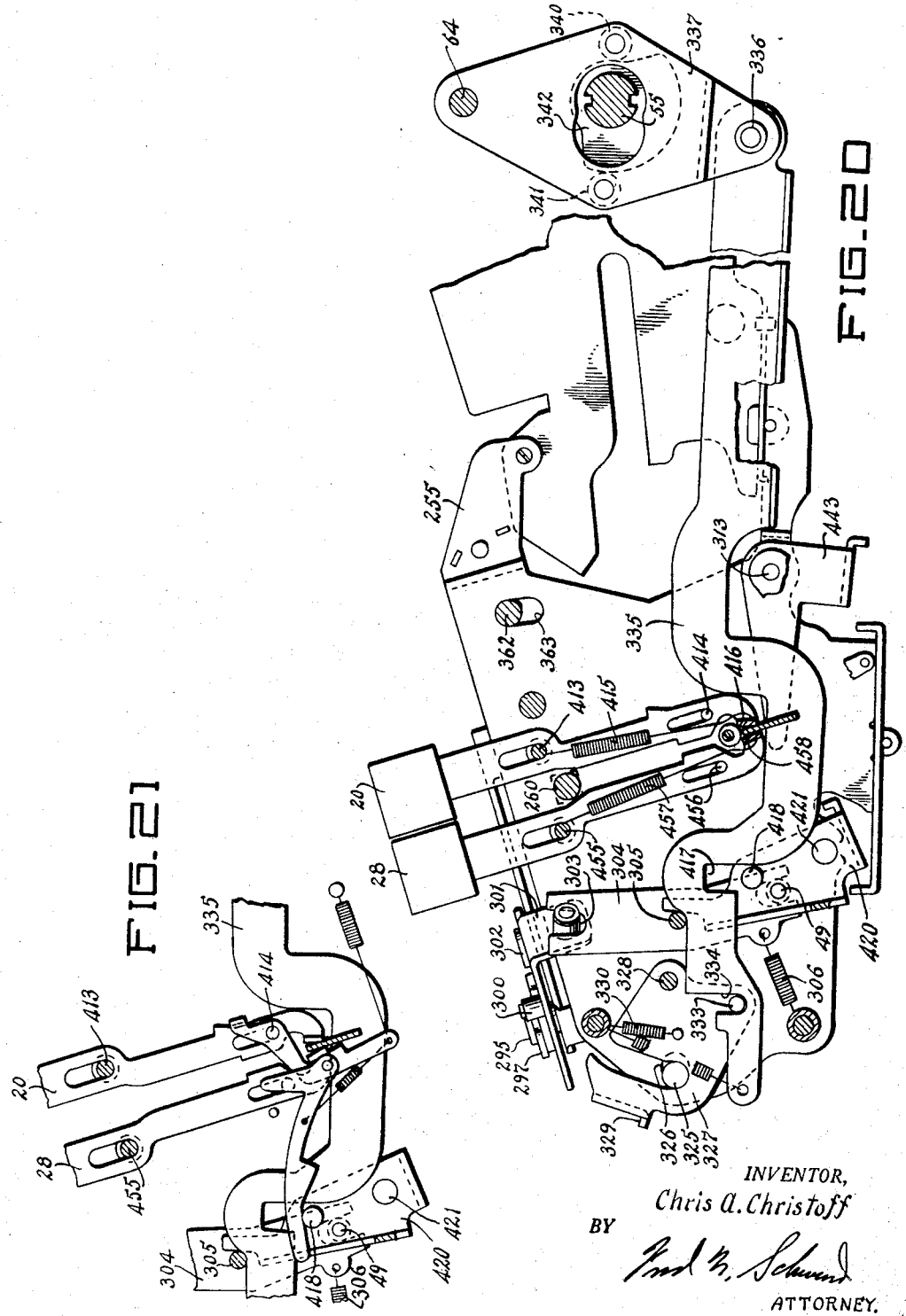

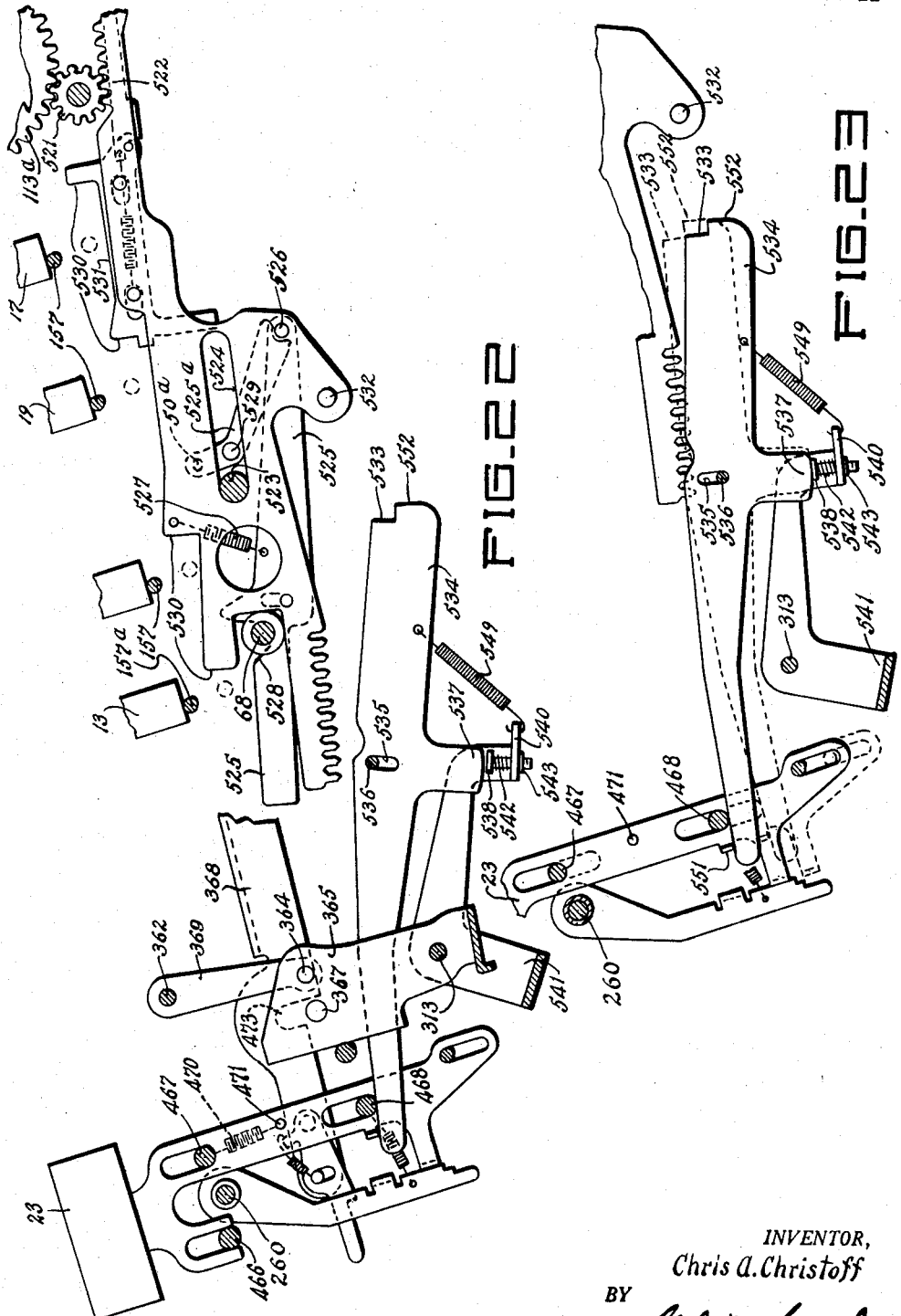

Sept. 26, 1961 C. A. CHRISTOFF 3,001,697
DIFFERENTIAL ACTUATOR CONTROL
Original Filed Nov. 16, 1953 14 Sheets-Sheet 13

INVENTOR,
Chris A. Christoff
BY
ATTORNEY.

Sept. 26, 1961   C. A. CHRISTOFF   3,001,697
DIFFERENTIAL ACTUATOR CONTROL
Original Filed Nov. 16, 1953   14 Sheets-Sheet 14

INVENTOR,
Chris A. Christoff
BY
ATTORNEY.

United States Patent Office 3,001,697
Patented Sept. 26, 1961

3,001,697
DIFFERENTIAL ACTUATOR CONTROL
Chris A. Christoff, San Gabriel, Calif., assignor to Clary Corporation, a corporation of California
Filed Apr. 14, 1955, Ser. No. 501,395
5 Claims. (Cl. 235—60.18)

This invention relates to calculating machines of the type capable of performing the four cardinal calculations; i.e. addition, subtraction, multiplication and division, and including instrumentalities for indicating and recording the factors and results of such calculations.

The present application is a division of the copending application Serial No. 392,294, filed on November 16, 1953, and entitled, "Calculating Machine," including ordinally shiftable factor storage and value entry control devices, since matured into Patent No. 2,833,476 issued on May 6, 1958. Reference is hereby made to said copending application for a complete disclosure of a calculating machine in which the present invention is embodied. It is to be understood, however, that the invention may be equally well embodied in other forms of recording calculating machines.

Also, the calculating machine illustrated herein is based partly on the well known Clary Adding Machine, portions of which are disclosed and claimed in the following U.S. Patents: Patent No. 2,472,696, issued on June 7, 1949 to E. P. Drake; Patent No. 2,492,200, issued on December 6, 1949 to R. E. Boyden; Patent No. 2,492,263, issued on December 27, 1949 to R. E. Boyden; Patent No. 2,506,337, issued on May 2, 1950 to R. E. Boyden; and Patent No. 2,583,810, issued on January 29, 1952 to R. E. Boyden.

A principal object of the present invention is to provide a calculating machine of the above type capable of recording and properly identifying different factors and results of calculations.

Another object is to differentially control a symbol printing device, or the like for a calculating machine of the above type.

Another object is to differentially control a symbol printing device or the like by different keys operated singly or in combination.

The manner in which the above and other objects of the invention are accomplished will be readily understood on reference to the following specification when read in conjunction with the accompanying drawings, wherein:

FIG. 2 is a partial longitudinal sectional view through the machine which, combined with FIG. 5, is taken along line 2:5—2:5 of FIG. 1.

FIG. 3 is a transverse sectional view through the multiplier-quotient counter, and is taken along line 3—3 of FIG. 27.

FIG. 4 is a fragmentary sectional plan view illustrating the multiplicand-divisor slide construction, and is taken substantially along line 4—4 of FIG. 2.

FIG. 6 is a side view illustrating the rack lock controls and part of the rack drive instrumentalities.

FIG. 7 is a side view illustrating the rack drive cams and cam follower.

FIG. 8 is a developed view of the symbol printing dial.

FIG. 9 is a side sectional view ilustrating the clutch and motor controls.

FIG. 10 is a side sectional view illustrating part of the clutch and accumulator controls associated with the multiply-divide lever.

FIGS. 11, 12 and 13 are similar to FIG. 10 but illustrate the mechanism in different conditions.

FIG. 14 is a side sectional view of the printer control mechanism.

FIG. 15 is a view of a sample tape having recorded thereon the factors and results of different types of computation performed by the machine.

FIG. 16 is a side sectional view illustrating the overdraft controls for arresting operation of the machine.

FIG. 17 is a side sectional view illustrating the accumulator positioning controls.

FIG. 18 is a side sectional view illustrating the multiplier-quotient counter actuating mechanism.

FIG. 19 is a side sectional view of the cams and cam follower operatively associated with the counter actuator of FIG. 18.

FIG. 20 is a side sectional view illustrating part of the multiply-divide control mechanism.

FIG. 21 is a fragmentary view illustrating the means for latching the divisor entry and the multiplicand entry keys in depressed positions.

FIG. 22 is a side sectional view illustrating part of the symbol printing mechanism.

FIG. 23 is a view similar to that of FIG. 22, illustrating the symbol printing mechanism in an alternative position.

GENERAL ARRANGEMENT

Figure 1:
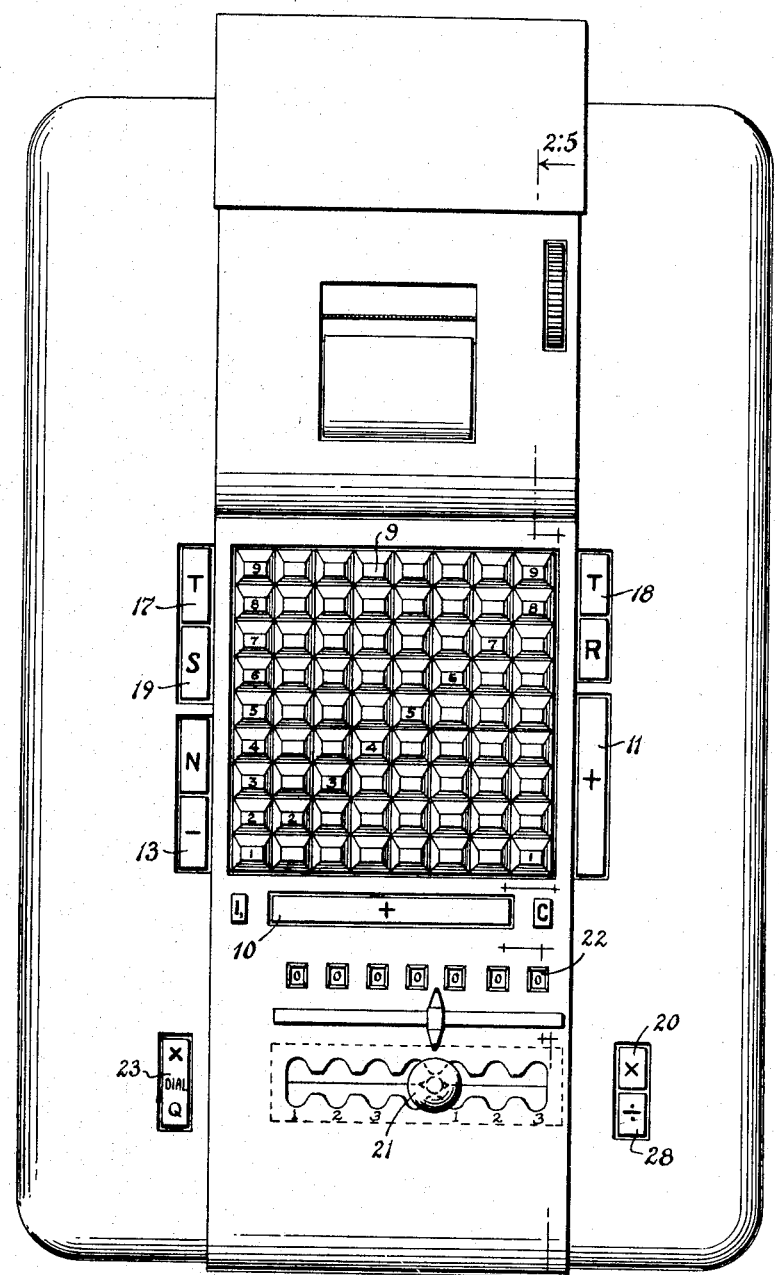
FIG. 1 is a plan view of a calculating machine embodying a preferred form of the present invention.

Referring to FIG. 1, an amount to be added or subtracted, the dividend and the divisor (in the case of division calculations), and the multiplicand (in the case of multiplication calculations), is entered into the machine by depressing appropriate amount keys 9 of the machine keyboard.

In order to add an amount, one or the other of the two add bars 10 and 11 is depressed, causing a cycle of operation of the machine to add the amount into an accumulator 8 (FIG. 5) and to print this factor on a paper strip 103. If the amount set up on the key 9 is to be subtracted from an amount registered on the accumulator, a minus bar 13 is depressed.

When it is desired to obtain the net total amount registered by the accumulator, one or the other of two total bars 17 and 18 is depressed. In the event it is desired to obtain a subtotal, a subtotal bar 19 is depressed.

In performing multiplication calculations, the multiplicand is set up on the amount keys 9 and a multiplicand entry key 20 is depressed, transferring the amount from the amount keys into a multiplicand-divisor storage device described hereinafter. After this time, the printing mechanism is actuated to record the multiplicand as at 24 (FIG. 15) on the recording tape 103. Then, the multiplier is entered into the machine by manipulation of a multiply-divide handle 21. The latter is slideable laterally of the machine and into different denominational relationships relative to the amount keys and accumulator, and is also rockable fore or aft of the machine to respectively effect add or subtract cycling. Thus, to obtain the product of a multiplicand factor by a multiplier factor of, for example, "23," the handle 21 would first be shifted to its tens denominational position and then rocked rearwardly and held there until the machine has additively cycled twice. Thereafter, the handle would be shifted to the right one step to its units denominational position and rocked rearwardly to effect three additive cycles of the machine. During this operation, the multiplier factor "23" would be entered into a multiplier-quotient counter 22 and the product would be accumulated in the machine accumulator 8. In order to record the multiplier factor and product, as well as clear the machine for subsequent calculation, a multiplier-quotient key 23 is depressed, clearing the counter 22 and printing this amount on the tape at 25 (FIG. 15), directly below the multiplicand factor 24 as indicated. Thereafter, one or the other of the total bars 17 and 18 is depressed to total out the machine accumulator and record the product as indicated at 26.

In division calculations, the dividend is first set up on the amount keys 9 and thereafter entered into the machine accumulator 8 by depression of one or the other of the add bars 10 and 11. Obviously, such factor is printed on the machine tape 103 as, for example, indicated at 27 (FIG. 15). The divisor is now entered into the keyboard and in its proper decimal relationship relative to the dividend, and the divisor entry key 28 is depressed, which effects transfer of the divisor into the multiplicand-divisor storage device and printing of the divisor at 27a. Now, handle 21 is moved laterally and normally to the left of the two initial illustrated positions until the divisor factor carried by the storage device is properly aligned with the dividend registered on the accumulator 8. Thereafter, the handle 21 is rocked forward to cause subtractive cycling of the machine. Such cycling will continue (providing the handle is held forward) until the remainder for that denomination reaches a value lower than that of the divisor at which time the machine automatically stops indicating an overdrafted condition. The handle is thereafter rocked rearward to effect a single additive corrective cycle and is then shifted one denominational position to the right, and the foregoing procedure is repeated. The net number of cycles performed in each denominational position of the handle 21 is registered on the storage device 22, thus indicating the quotient.

In order to record the quotient and clear the machine for subsequent calculation, a multiply-quotient key 23 is degressed, clearing the storage device 22 and printing the amount i.e. quotient, on the tape as indicated at 30 (FIG. 15). The remainder now remaining in the machine accumulator 8 is printed as at 29 on the tape and the accumulator cleared by a totaling operation effected by depression of one or the other of the total bars 17 and 18.

*Keyboard*

The keyboard, including the amount keys 9 (FIGS. 1, 2 and 5) is of the flexible type, and each amount key, when depressed, serves as a stop to limit movement of an aligned drive rack 31. The latter is effective to drive an associated gear element of the accumulator 8 an amount corresponding to the differential movement of the rack to set the printing mechanism to print such an amount and, during entry of a multiplicand or divisor factor, to set stop slides 32.

Figure 5:
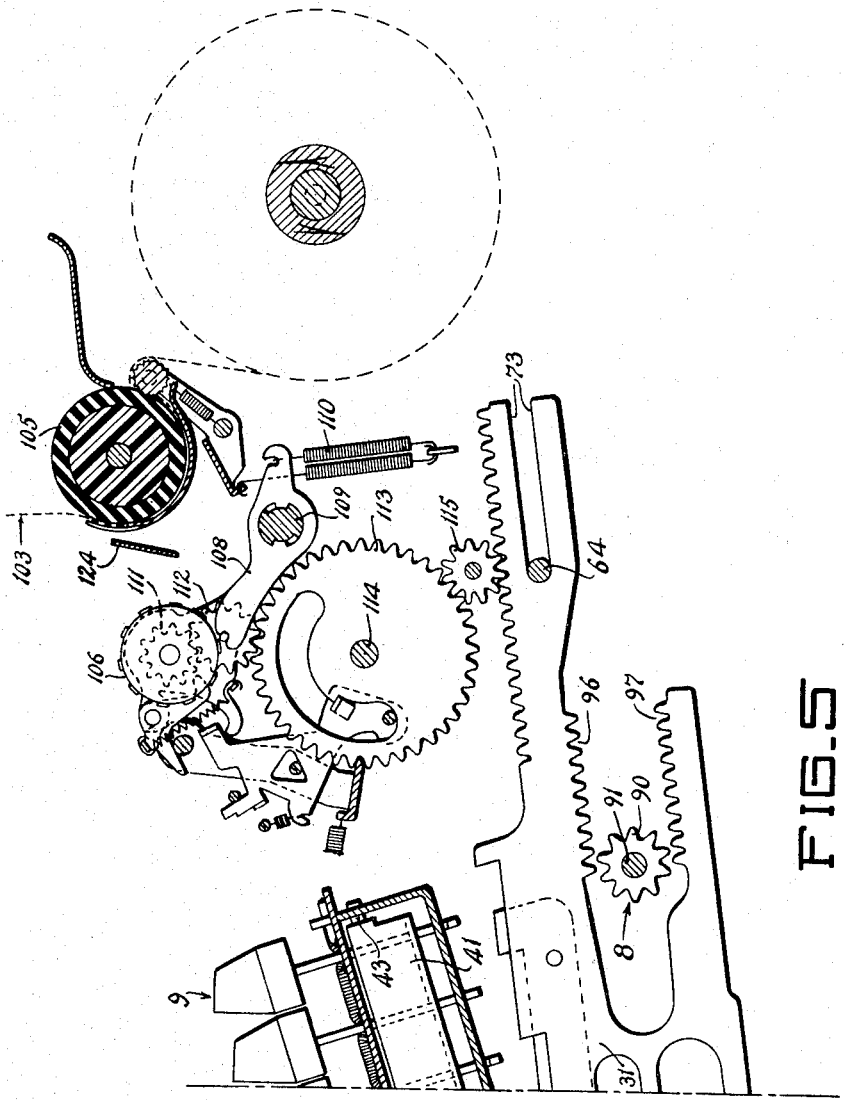
FIG. 5 is a partial longitudinal sectional view through the machine as taken along the rear portion of the line 2:5—2:5 of FIG. 1.

The amount keys in each row are yieldably pressed upward by tension spring 37. Each key, when depressed, is latched in blocking position relative to its rack by a locking bail 41 pivoted at opposite ends thereof to the vertical wall of a key frame 36 by trunnion bearings 42 and 43 (FIGS. 2 and 5). For this purpose, each key stem has a cam lobe (not shown) formed thereon which, when the wey is depressed, rocks an associated locking bail 41 laterally against the action of a tension spring 44 extending between the top of each bail and the bottom of the adjacent bail. As the key reaches the bottom of its stroke, the spring 44 returns the bail to a position over the top of the cam lobe, thereby latching the key in depressed position.

The stems of keys 9 cooperate with respective ones of a series of shoulders 46 formed on the aligned racks 31 to differentially control positioning of the later. The various shoulders 46 are spaced apart distances slightly greater than the distances between the key stems so that depression of any key will permit forward movement of the associated rack a number of increments equal to the value of the depressed key.

A zero block 47 extends downward from each of the locking bails 41, and when no key in the associated order depressed, the zero block 47 in that order will be held by its bail 41 directly in front of one of the shoulders 46 of the aligned rack, thereby preventing a substantial forward movement of this rack. However, on depression of an amount key, the locking bail in the respective order will be held outward sufficiently to retain the zero block 47 out of cooperative relation with the associated rack.

*Drive*

The various units of the machine are driven by a rotatable drive shaft 55 (FIGS. 6, 7, 9, 14, 16, 17, 19 and 20) from an electric motor (not shown) under control of a cyclically operable clutch generally indicated at 56 (FIGS. 9 and 16). The driven side of the clutch is attached to the shaft 55 and the clutch is controlled by a clutch dog 57, pivoted at 58, and arranged to effect engagement of the clutch upon counterclockwise rocking thereof from its position shown in FIGS. 9 and 16.

Means are provided for reciprocating the racks 31 once during each cycle of operation of the machine. Referring to FIG. 7, a pair of juxtaposed complementary drive cams 60 and 61 are keyed on the shaft 55 in cooperation with respective ones of rollers 62 and 59 mounted on a cam follower 63. The latter is pivoted on a stationary shaft 64 and is connected by a link 65 (see also FIG. 6) to an arm 66 suitably fastened to a rock shaft 67. A similar arm 66a (FIG. 2) is also fastened on the shaft 67 on the opposite side of the machine and both arms are bifurcated to embrace a rack drive shaft 68 mounted for fore and aft movement in elongated slots, one of which is shown at 70, formed in machine frame plates 71.

Referring to FIGS. 2 and 5, each of the drive racks 31 is supported at its forward end by the drive shaft 68, the latter being slideably embraced by a slot 72 in the rack. The rear ends of the racks are provided with elongated slots 73 which embrace the stationary shaft 64.

Means are provided to form a yieldable connection between the rack drive shaft 68 and the various racks during forward movement of the former. For this purpose, each slot 72 terminates at its closed end in opposed notches 74 normally engaged by rollers 75 carried by drive elements 76. The latter are pivoted on the shaft 68, and the adjacent drive elements 76 associated with each rack are spring urged in opposite directions by a tension spring 77 extending between the tails of the two elements so as to yieldably hold the rollers in the notches and thus form a yieldable drive connection between the shaft and the respective racks 31.

When, during forward movement of the shaft 68, as occurs during the first half of the machine cycle, a drive rack is arrested due to striking against a depressed key stem or engagement of a "nines" stop shoulder 80 against a locking bail 81, the rollers 75 ride out of the associated notches 74, thereby breaking the connection between the shaft 68 and the rack.

The racks 31 are returned to their zero or home positions during the latter half of each machine cycle by the cams 60 and 61 (FIG. 7) and means are provided for locking all of the various racks in their zero or home positions at the completion of a machine cycle as well as at their forwardly advanced positions during the midpoint or printing phase of a cycle. For this purpose, the locking bail 81 is effective to engage any of a series of notches 82 formed in each of the racks, after both the forward and the return movements of the racks. The bail 81 is pivoted at 83 and is provided at one end with an arm 84 (FIG. 6) connected by a link 85 to a cam follower 86. The latter is pivoted on the stationary shaft 64 and is provided with rollers 78 and 79 which cooperate with respective ones of a pair of complementary drive cams 88 and 89 keyed on the drive shaft 55.

*Accumulator*

The details of the accumulator unit are not pertinent to the present invention and are thus omitted. However, reference is had to said Drake Patent No. 2,472,696 for details of the accumulator.

In general, the accumulator comprises a series of denominationally arranged ten tooth accumulator gears 90 (FIGS. 5 and 16) independently and rotatably mounted on an accumulator shaft 91. The shaft 91 and a second shaft 92, also forming part of the accumulator, are guided at opposite ends thereof in vertical grooves 93 and 94 (FIG. 17) formed in plates, one of which is shown in 95, suitably secured in a manner not shown to the machine frame plates 71.

Means are provided for raising and lowering the accumulator unit for the purpose of engaging the various accumulator gears 90 with either upper or lower rack gear sections 96 and 97, respectively, formed on the drive racks 31. During additive operations, the accumulator is raised to mesh the accumultaor gears with the upper rack sections 96 so that during forward movement of the racks the gears will be rotated in a counterclockwise direction, while during subtractive operations the accumulator is lowered to mesh the gears 90 with the lower rack sections 97 to effect a clockwise rotation of the gears.

For the purpose of raising and lowering the accumulator unit in accordance with the type of operation to be performed, box cams, one of which is indicated at 98 (FIG. 17), are provided at opposite sides of the machine. Each cam is pivoted on a frame stud 100 and is provided with a cam slot 101 which embraces a roller 102 mounted on the respective end of the accumulator shaft 91. Clockwise rocking movement of the cam 98 from its illustrated neutral position will raise the accumulator into its additive position whereas counterclockwise rocking of the cam will lower the accumulator to its subtractive position.

*Printer*

The various values registered on the racks 31 during either item entry or totaling operations are printed on the paper tape 103 (FIGS. 5 and 15) which is fed around a rotatable platen 105 to a printing station where the values are printed thereon.

The printer comprises a series of numeral printing wheels 106, one entrained with each drive rack 31. Each printing wheel 106 is rotatably mounted on an individual lever 108 which is loosely keyed on a printer control shaft 109 and is spring urged toward the platen 105 by an individual tension spring 110. A gear 111 fixed to each printer wheel 106 meshes with an associated gear 112 also rotatably mounted on each lever 108. Except during printing operations, the levers 108 are held by the shaft 109 in positions illustrated in FIG. 5 wherein the gears 112 mesh with idler gears 113 rotatably mounted on a shaft 114. The latter idlers are continuously entrained with respective ones of the drive racks 31 through pinion assemblies, one only of which is shown at 115.

The printer control shaft 109 (see also FIG. 14 is controlled by a printer cam 116 keyed on the drive shaft 55. The cam 116 engages a roller 117 on a cam follower 118 which is pivoted on the shaft 64 and is provided with a camming surface 120 engaged by a roller 121 on an arm 122 fixed to the shaft 109. A tension spring 123, along with the various springs 110, holds the cam follower 118 in engagement with the cam 116.

During the printing phase, which occurs at approximately mid-cycle, and after the racks have set the printing wheels 106, the cam 116 allows the shaft 109 to be rocked clockwise, thereby allowing the levers 108 to force the printing wheels 106 into contact with a printing ribbon 124 and into contact with the tape 103 at the printing station.

*Clutch control*

Engagement of the clutch 56 (FIGS. 9 and 16) is effected by depressing any of the various machine control bars as well as by rocking of the multiply-divide handle 21 fore or aft of its full line position shown in FIG. 2. Normally, the machine will continue to cycle as long as the control bar or handle is held in actuated position, but upon an overdraft of the accumulator in one direction or the other, the clutch will be automatically disengaged, even though the control bar or handle is held in actuated position.

Referring to FIG. 9, the clutch control dog 57 is normally urged clockwise by a tension spring 145 to maintain the clutch in disengaged condition. The clutch dog is normally coupled to a clutch control bar 146 by a hook member 147 pivoted to the bar at 148. The hook member 147 has a notch normally held in embracement with a pin 150 on the clutch dog by a tension spring 151.

The clutch control bar 146 is supported for longitudinal movement by a pair of frame pins 153 and 154 embraced by elongated slots 155 in the bar. The control bar 146 has a series of inclined cam slots 156 formed therein, each of which underlies a pin 157 and 157a carried on a lever 158 pivoted on a frame pin 159 and urged upwardly by a spring 160 extending from a suitable frame pin (not shown) to the respective pin 157. The pins 157 underlie various control bars, i.e. 13, 17 and 19. Therefore, depression of any of these bars will cause its associated pin 157 to cam the control bar 146 forwardly to thus rock the clutch control dog 57 counterclockwise, causing engagement of the clutch.

Provision is also made to effect engagement of the clutch upon depression of the add bar 10. As shown in FIG. 2, the add bar 10 is connected by a pin and slot connection 38 to a bail 45 which extends across the machine and is pivotedly supported at 48. The bail carries a roller 161 (FIG. 9), the latter coacting with a camming surface 162 formed on the forward end of the clutch control bar 146 so as to cam the latter forwardly upon depression of the add bar.

For the purpose of automatically disengaging the clutch 56 upon an overdraft of the accumulator in either direction, the accumulator gear 90a (FIG. 16) located in the highest denominational order in the machine is provided with a laterally extending ear 170 which cooperates with a pair of by-pass pawls 171 and 172. The latter are pivotedly supported at 173 and 174, respectively, on a plate 175 pivoted on the lower accumulator shaft 92. A spring 176 is tensioned between the tails of the pawls 171 and 172 to normally hold the same in contact with a hub 177 on the plate 175.

The plate 175 is detented in either of two positions by a detent 178 pivoted at 180 on an associated accumulator brace plate 181. A pin 182 on the detent is held in engagement with one of two detenting notches in the plate 175 by a spring 183 tensioned between the shaft 192 and pin 182.

The plate 175 is connected by a link 184 to the lower end of a lever 185. The latter is fulcrumed on the pin 58 and is provided with a camming stud 186 which coacts with a camming surface 187 formed in the hook 147. Thus, when an overdraft occurs and the highermost order accumulator gear 90a accordingly passes between "9" and "0" registration, the ear 170 will pick up one or the other of pawls 171 and 172 (depending upon the current rocked position of the plate 175) and thus, through the link 184, will rock the lever 185, moving its pin 186 between its full line position shown and its dotted line position 186a to cam the hook member 147 upwardly and thus permit the clutch 57 to be retracted by its spring 145 into clutch disengaging position.

Accumulator controls

Mechanism is provided to raise or lower the accumulator under control of the multiply-divide handle 21 and the various control bars, excepting keys 20, 23 and 28. As shown in FIG. 17, the cam 98 carries two pins 203 and 204 located on opposite sides of the pivot 100. These pins are adapted to be selectively engaged by a hook member 205 pivotedly connected at 202 to a three-arm lever 206 pivoted on the shaft 64. The cam follower is urged counterclockwise by a tension spring 207 to press a roller 208 thereon against a cam 209 keyed on the drive shaft 55.

The cam 209 has a high portion extending over substantially half of its periphery whereby to rock the cam follower 206 and thereby normally position the hook member rearwardly during approximately the first half of the machine cycle.

Normally, when the machine is at rest and during additive operations, such as addition and multiplication, the hook member is held in a raised position by a tension spring 205a wherein a slot in the upper edge thereof engages the pin 203 so that as the hook member is moved rearwardly it will rock the box cam 98 clockwise to raise the accumulator into its additive position.

Means are provided under control of certain of the control bars and the multiply-divide handle 21 (when rocked forwardly) for locating the hook member 205 in its lowermost position wherein it will engage the pin 204 to effect substractive entries into the accumulator. For this purpose, a control bar 50 is provided, being supported for longitudinal movement by a pair of parallel links 210 suspended from frame pins 211. The bar 50 is provided with inclined camming surfaces 212 underlying the aforementioned pins 157 associated with the control bars, i.e. 13, 17 and 19.

The control bar 50 has a pin and slot connection to 213 with a bell crank 214 which is fulcrumed at 215 and is provided with a roller 216 embraced by an elongated slot formed in the hook member 205. The camming surfaces 212 on the bar 50 are so arranged that upon depression of the minus bar 13, total bar 17 or subtotal bar 19, the control bar will be moved forwardly to its fullest extent which will be effective, through bell crank 214, to lower the hook member 205 into embracement with the pin 204.

Multiply-divide mechanism

Referring to FIGS. 2, 4, 24, 25 and 27, the multiply-divide mechanism comprises a series of multiplicand-divsor stop slides 32 spaced apart the same distance as the racks 31 and slideably carried on belt 236. The belt, which is constructed of thin flexible metal, is wrapped around a pair of flanged pulleys 237 and 238 whereby to carry the various slides 32 into different denominational relationships with the racks.

The belt 236 is normally positioned to maintain the stop slides 32 out of alignment with the various racks, i.e. between adjacent racks as indicated in FIG. 4, but is movable laterally of the machine by the handle 21 into any of various selected positions wherein the slides are located in the paths of aligned racks.

As shown in FIG. 4, each stop slide has an elongated slot 240 therein embracing two guide pins 241 and 242 fastened to the belt 236. A tension spring 243 extends between the rearmost pin 242 and a pin 244 fastened on the slide whereby to normally hold the slide in its rearmost illustrated position. In such rearward position, the slides 32 are held a slight amount forwardly of the forward ends of the associated extensions 373 or racks 31, leaving a slight gap 245 (FIG. 2) permitting the various slides to move laterally past the various racks without interference.

The belt 236 is carried around the pulleys 237 and 238, and a tension spring 247 (FIG. 24) is connected between the ends thereof to form an endless belt arrangement.

The multiply-divide handle 21 is mounted on a U-shaped carriage 257. The latter rotatably supports a set of four rollers 258 located in rolling engagement with a square shaft 260. The rollers permit lateral movement of the handle along the shaft, but cause the shaft to rock with the handle in any of the denominational positions thereof. The latter shaft is provided with bushings 261 and 262 rotatably mounted in bearings formed in the side frame plates 254 and 255.

Means are provided to couple the belt 236 to the handle 221 whereby to carry the former into different denominational positions relative to the racks 31. For this purpose a connecting member 263 is pivoted at 265 to the carriage 257 for movement about a horizontal axis only. A depending finger 266 on the connector extends downwardly into an elongated slot 267 (FIG. 4) formed in the belt 236. The connector also fits in a groove 268 (FIG. 27) of a four-toothed counter actuator gear 270 which is slideably keyed on a counter actuator shaft 271. Thus, as the handle 21 is moved along the shaft 260 it will, through the connector 263, carry the belt 236 and actuator 270 therewith to align the stop slides 32 in cooperative relation with different ones of the racks and to align the actuator 270 in cooperative relation with different ones of the series of toothed dials 272 comprising the multiplier-quotient counter 22.

A stationary top plate 273 is provided having an elongated slot 276 (FIG. 26) through which the handle 21 extends. This slot is provided with a series of opposed notches 277 located in the different denominational orders of the machine. Such notches receive the lower portion of the handle 21 upon fore and aft rocking of the handle to permit rocking of the latter only when in a denominational position.

Figure 24:
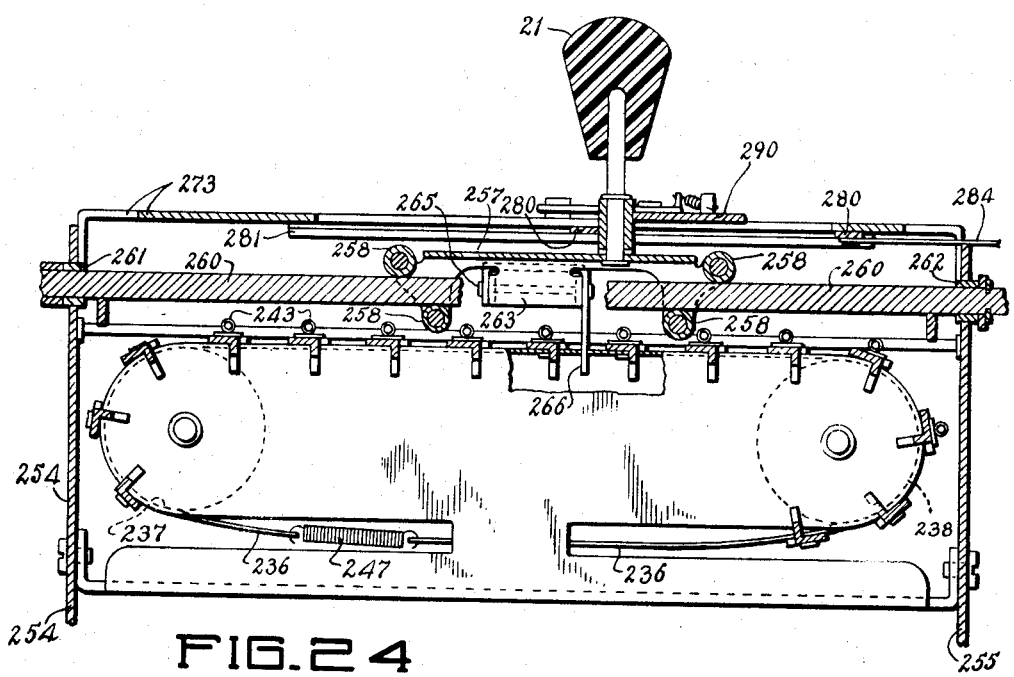
FIG. 24 is a sectional view through the multiply-divide control mechanism and is taken substantially along lines 24—24 of FIG. 2.
Figure 25:
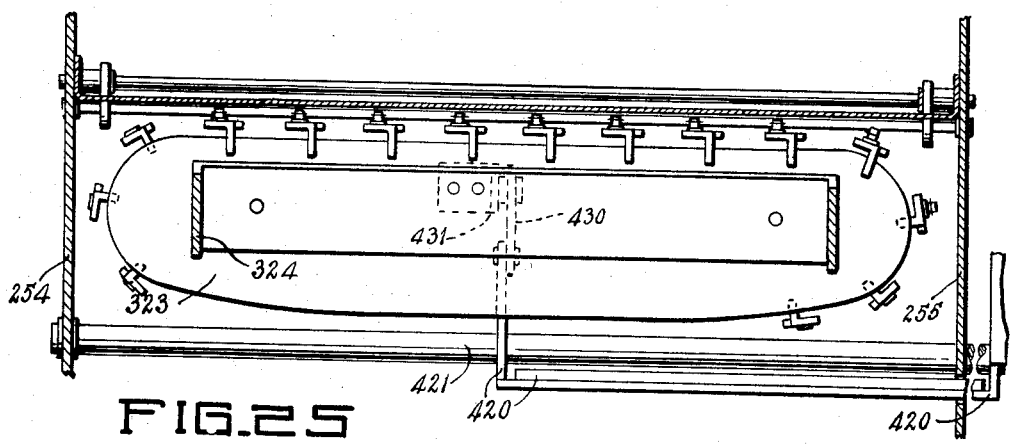
FIG. 25 is a view similar to FIG. 24 but taken forwardly thereof, substantially along lines 25—25 of FIG. 2.

Means are provided for normally urging the handle 21 to the right into its position shown in FIGS. 1 and 24. For this purpose, a rectangular plate 280 is slideably mounted in guides 281 and 282 on the under surface of the plate 273. The plate is urged to the right by a tension spring 283 connected at one end thereof to a cable 284 and attached at its opposite end (not shown) to a portion of the machine frame. The cable 284 is reeved over a pulley 285 and is attached at 288 to the plate 280. Tabs 289 limit the rightward movement of the plate 280.

A return slide 290 is provided to return the handle 21 leftwardly, into its illustrated position in the event it has been manually moved to the right of such position. The slide has an elongated slot 291 slideable along guide pins 292 fixed to the top plate 273. The slide 290 is engageable by the handle 21 and is connected by a pin and slot connection 293 to a bell crank 294 pivoted on a pin 295 fixed to an extension of the plate 273. A spring 296 of approximately the same strength as spring 283 is tensioned between the plate 273 and the bell crank 294, thereby yieldably maintaining the latter, along with the slide 290 in the position shown against the handle wherein these parts are limited by a lever 297 also pivoted on the pin 295 and provided with an ear 298 engageable by the bell crank 294. The opposite end of lever 297 is normally limited against a roller 300 carried on a bell crank 301 fulcrumed at 302. The bell crank 301 is coupled through a pin and slot connection 303 to an actuating lever 304 (see also FIG. 20). The latter is pivoted at 305 and is normally held in its illustrated position by a tension spring 306.

Means are provided whereby rocking of the handle 21 fore or aft of its neutral position into either of its alternative positions shown by the dotted lines 21a and 21b of FIG. 2 will cause engagement of the clutch and positioning of the accumulator. Referring to FIGS. 10 and 13, inclusive, the aforementioned shaft 260, rockable by the handle 21, is fastened to an arm 310 which is connected through a yieldable link 311 to an actuating arm 312 pivoted on a frame pin 313. The link 311 is normally held to the length shown in FIG. 10 but may be extended or contracted beyond this length.

Rearward (clockwise) rocking of the handle 21 to effect additive operations of the machine will rock the arm 312 counterclockwise into its alternative position shown in FIG. 12, causing an ear 318 thereon to engage a foot 319 on the aforementioned clutch control bar 146 to effect engagement of the clutch. Since, as mentioned heretofore, the accumulator is normally conditioned for an add operation, the accumulator positioning control bar 50 (FIG. 17) will remain unaffected.

Rocking of the handle 21 forwardly (counterclockwise) will cause the arm 310 and link 311 to rock the arm 312 clockwise into its position shown in FIG. 11 causing the upper tip thereof to engage an ear 320 on the lever 158 associated with the minus bar 13. The lever 158 will, through the accumulator positioning control bar 50, cause the accumulator to be lowered into subtractive relation with the racks.

Describing now the means for holding the stop slides 32 in rack arresting position during multiplication and division calculations, the majority of such slides are provided with combing teeth 322 (FIG. 2) engageable by a locking bail 323. The latter is carried on arms 324 pivotally mounted on a shaft 325 which is carried in elongated slots 326 formed in the side frame plates 254 and 255. The locking bail 323 is normally held as shown whereby to hold the various stop slides in position.

The pivot shaft 325 is embraced at opposite ends thereof by cam slots formed in cam members 327 (FIG. 20). The latter are connected by a bail bar 329 and are pivoted at 328. The cam members are normally urged into their clockwise rocked position by a spring 330 so as to hold the locking bail 323 in its forward position whereby to maintain the gap 245 (FIG. 2) between the stop slides and the respective racks.

A pin 333 on the cam member 327 is normally engaged by a slot 334 in an actuator link 335. The latter is connected at 336 to a cam follower 337, pivoted on shaft 64 and provided with rollers 340 and 341 which engage opposite sides of a cam 342 keyed on the drive shaft 55.

During multiplication and division operations the link 335 is drawn rearwardly at the start of each cycle, rocking the cam member 327 to force the locking bail 323 rearwardly an amount equal to the gap 245 (FIG. 2).

*Multiplier-quotient counter*

The various dials 272 (FIGS. 2 and 3) comprising the counter 22 are rotatably mounted on a counter shaft 362 which extends through slots (one of which is shown at 363, FIG. 20, in the side frames, i.e. 255). The shaft 362 is normally held in its illustrated raised position by a toggle arrangement located on opposite sides of the machine. One such toggle arrangement is shown in the FIG. 22 and comprises an arm 369 pivoted at the upper end thereof to the shaft 362 and pivotally connected at 364 to one arm of a bail 365 which is fulcrumed on the shaft 313. A pin 367 on the bail 365 is normally engaged by a shoulder formed on the link 368, the other end of which is pivoted at 472 (FIG. 17) to the cam follower 206.

Each dial 272 has integral therewith, a ten-toothed gear 371 (FIG. 2) adapted to be meshed by a rack extension 373 formed integral with an aligned one of the racks 31. Detents 374 pivoted on shaft 375 are held in engagement with the gears 371 by springs 376.

*Counter actuator mechanism*

The counter actuator 270 (FIG. 2) is rotated one quarter revolution during each cycle while the machine is performing multiplication or division operations whereby to advance an aligned dial 272 one increment in an appropriate direction.

The direction of rotation of the dials 272 during multiplication and division problems is predetermined by depression of one or the other of the two factor entry keys 20 and 28, as an incident to entry of multiplicand or divisor factors.

The means for intermittently rotating the shaft 271 and actuator 270 comprises a link 384 (FIGS. 18 and 19) arranged for reciprocation in one direction or the other from its neutral illustrated position. This is accomplished by a pair of juxtaposed cams 385 and 386 keyed on the drive shaft 55 and coacting with respective cam followers 387 and 388. Tension springs 390 and 391 maintain the cam followers in contact with the cams to locate pins 391 and 392, respectively, thereon in registry with notches 393 and 394 formed on extensions of the link.

The link is provided with an elongated slot 396 at its forward end which embraces a stud 397 carried on an arm 398 fastened to the shaft 260.

A pair of actuating pawls 400 and 401 are pivotedly mounted on the link 384 and a spring 402 is tensioned between the pawls to normally retain the same in their relative and centered positions shown in FIG. 18. The latter pawls are adapted to coact with four equally spaced rollers 403 mounted on a pin type ratchet wheel 404 attached to the actuator shaft 271. In a normal arrangement of the parts, as shown in FIG. 18, reciprocation of the link 384 in either direction in response to depression of one of the machine control bars will result in one or the other of the actuating pawls 400 and 401 passing in between two pins of the roller 403. However, when the handle 21 is rocked fore or aft, the forward end of the link 385 will be raised or lowered causing the pawls 400 or 401 to advance the ratchet wheel 90° in an appropriate direction, depending upon the movement of the link 384 as will appear hereinafter.

*Multiplicand entry control*

The multiplicand entry key 20 (FIGS. 1, 18, 20 and 21) is effective upon depression to cause entry of a multiplicand factor from the amount keys 9 into the stop slides 32. The stem of the key 20 is provided with elongated slots guided over frame pins 413 and 414. A spring 415 tensioned between the lower end of the key stem and pin 413 normally holds the key in its illustrated raised position.

Figure 26:
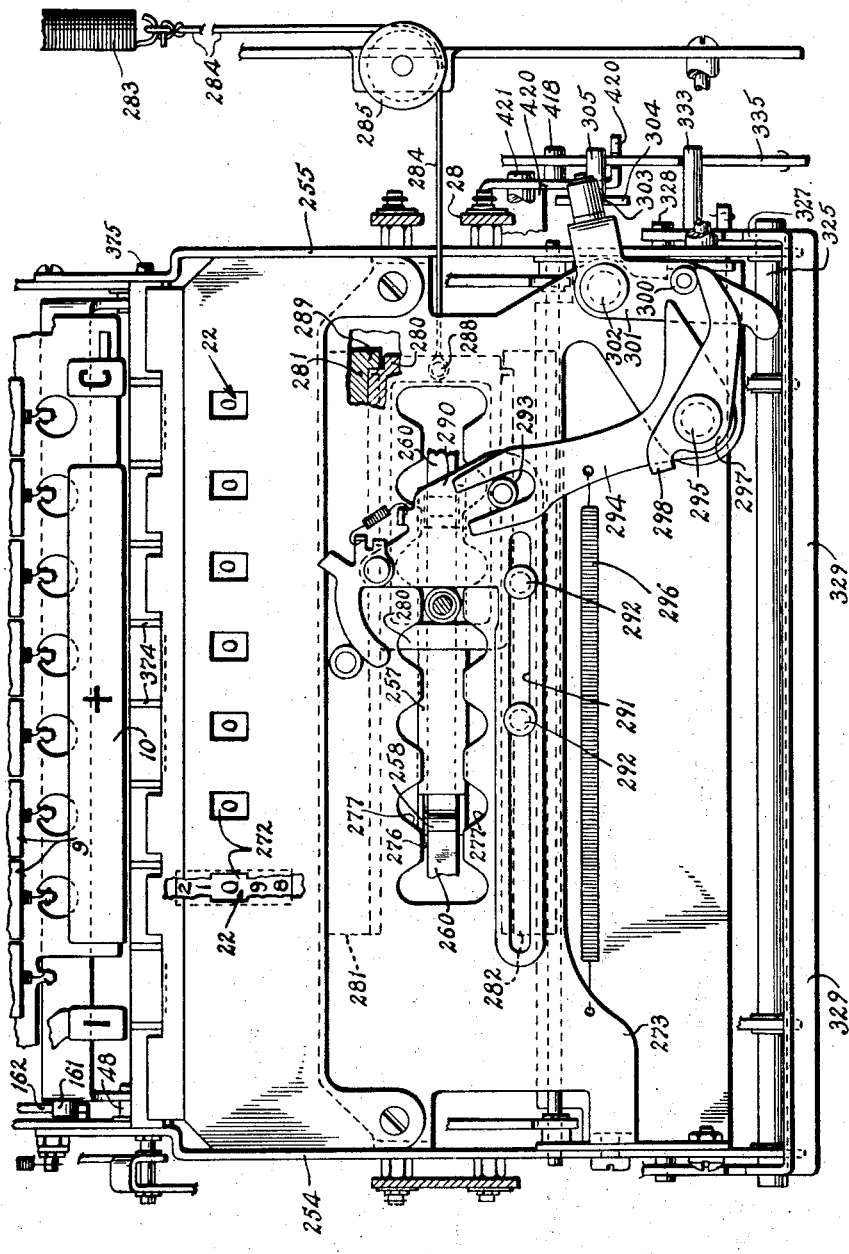
FIG. 26 is a plan view of the multiply-divide control mechanism and is taken in the direction of the arrow 26 of FIG. 2, with the machine cover removed.
Figure 27:
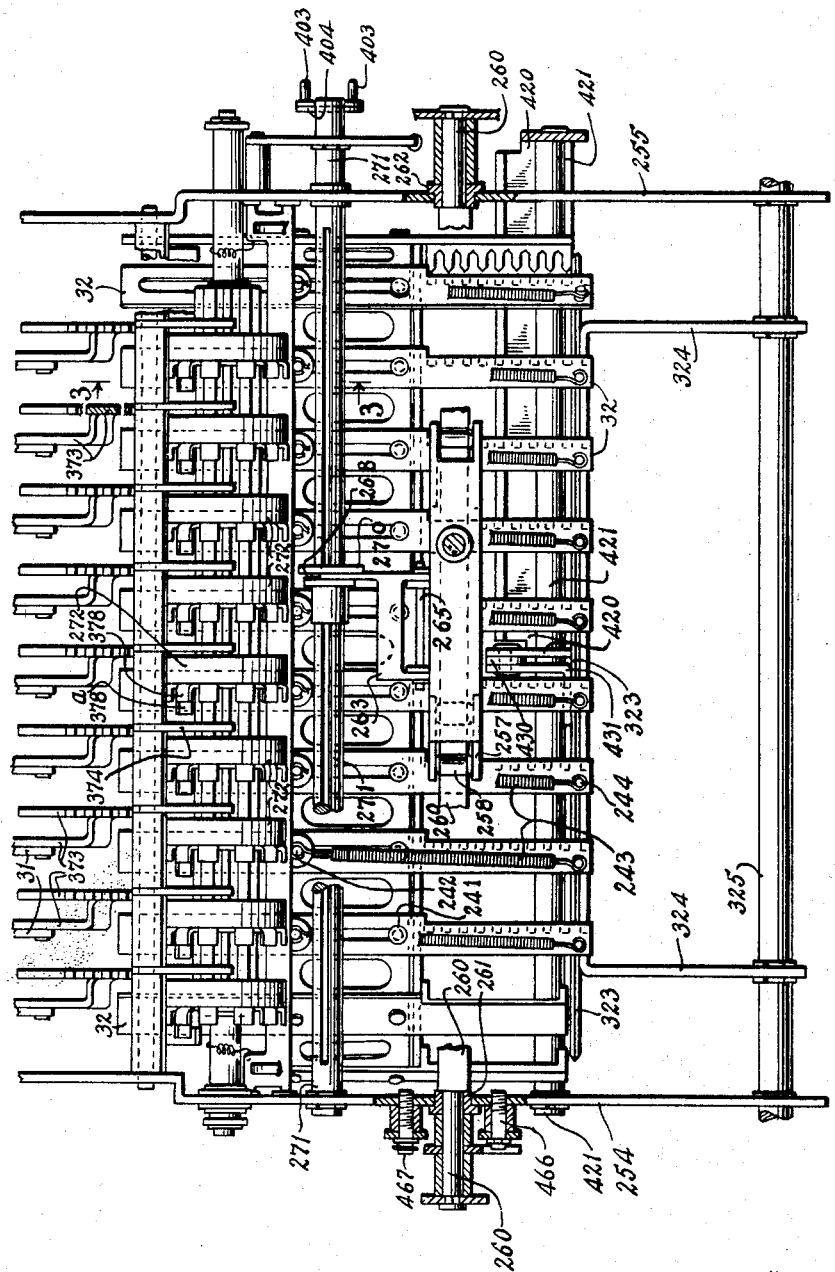
FIG. 27 is a sectional plan view similar to FIG. 26 but is taken substantially along the line 27—27 of FIG. 2.

Means are provided which are responsive to depression of the key 20 for laterally setting the handle 21, and consequently the flexible belt 236 and slides 32 one-half denominational order to the left of that shown in FIGS. 24 and 26 to align the slides 32 with the rack extensions 373 so that the latter may be effective to set the slides. For this purpose, any ear 416 on key 20 overlies the aforementioned link 335, and upon depression of the key 20 the link 335 is lowered, setting a notch 417 therein in embracement with the pin 418 on the bail 420. The latter is pivoted at 421 and is coupled through the pin and slot connection 49 to lever 304. In the machine cycle initiated by depression of key 20, the link 335 will be drawn rearwardly, rocking the bail 420 clockwise which through levers 304 and 301 (FIGS. 20 and 26) will cause the roller 300 on the latter to engage the tail of bell crank 294. The latter will thus be rocked counterclockwise to shift the slide 290 leftward, thus locating the handle 21 in its next denominational position to the left.

The lock bail 323 (FIGS. 2 and 25) must be removed from engagement with the slides 32 during setting of the latter by the racks 31 in multiplicand entry operations. For this purpose, the bail 420 (FIGS. 2 and 20) is connected through a link 431 to the lock bail. Consequently, as the bail 420 is rocked clockwise by the link 335 at the start of a cycle, the lock bail 323 will be rocked downwardly to clear the teeth of the various slides.

The multiplication entry key 20 is effective to condition the counter actuating mechanism to drive the actuator 270 in the appropriate direction if such actuating mechanism is not already so conditioned. In normal condition of the parts, a spring 434 (FIG. 19) is effective to hold the link 384 in its illustrated position wherein the notch 394 thereof embraces the pin 392 on the cam follower 388 so that the link will be moved rearwardly from its neutral position during the ensuing multiplying operation. However, in case the previous operation was one of division, the rear end of the link 384 will be held in an upper position wherein the notch 393 thereof embraces the pin 391 of the cam follower 387. In this condition, the link will be forced forwardly of its illustrated position during the machine cycle and the link 384 will be held in its rocked position by a lever assembly 435a—435b pivoted at 436 and held in a counterclockwise position by a latch 437. The latter is fulcrumed at 438 and urged into engagement with an ear 442 on the lever assembly by a spring 440. In such case, depression of the multiplier key 20 will cause the ear 416 thereof to cam the latch clockwise, releasing the lever 435a—435b, so that the spring 434 may rock the link 384 back to its normal illustrated position.

The multiplicand entry key 20 is also effective, upon depression, to cause setting the accumulator 8 (FIG. 5) into its neutral position and to cause engagement of the clutch and operation of the motor. As shown in FIG. 20, the ear 416 of key 20 overlies part of a bail 443 pivoted at 313. The bail has an arm 444 (FIGS. 10 to 13) having a pin 445 thereon, the latter aligned with the camming surface 446 formed on the forward extension of a slide 447 which normally functions as an integral part of the accumulator positioning control bar 50 (FIG. 17). The pin 445 also lies behind the foot 319 of the clutch control bar 146 (see also FIG. 9). Thus, as the bail 443 is rocked counterclockwise, due to depression of the key 20, the pin 445 will first cam the slide 447 to position the accumulator positioning control bar in its neutral non-add position. Thereafter, the pin 445 will strike the foot 319 to actuate the clutch control bar.

Divisor entry controls

The divisor entry key 28 (FIGS. 1, 18, 20 and 21) is effective upon depression to cause entry of a divisor factor from the keys 9 into the stop slides 32. The key 28 is mounted for depression on frame pins 455 and 456, and a spring 457 extending between the upper pin 455 and the key stem normally holds the key in its illustrated raised position. An ear 458 on the key is effective upon the depression thereof to lower the link 335 into coupling engagement with the pin 418 on the bail 420 in the same manner as is effected by the key 20. Also, the lever 304 will be rocked by bail 420 to position the slides 32 in alignment with the racks 31 in the manner described heretofore.

The ear 458 on key 28 overlies the forwardly projecting arm of bail 443 whereby depression of the key will cause operation of the motor, engagement of the clutch, and positioning of the accumulator in its neutral condition in the same manner as is effected by the key 20.

The key 28 is effective, upon depression, to condition the counter actuating mechanism to appropriately drive the counter during succeeding division operations so as to positively count subtractive cycles of operation, and subtractively count additive cycles, if such mechanism is not already set in that condition. As shown in FIG. 18, the ear 458 of key 28 overlies the forward end of the aforementioned lever assembly 435a—435b and is thus effective to rock the latter counterclockwise until latched by the latch 437. Thus, the rear end of the link 384 (FIG. 19) will be raised to engage the notch 393 with the pin 391 of cam follower 387 as mentioned heretofore.

Multiplier-quotient counter clearing controls

The multiplier-quotient key 23 (FIGS. 1, 13, 22 and 23) is effective upon depression thereof to cause clearing of the multiplier-quotient counter 22 and to record the amount registered thereby onto the tape 103.

The key is guided on frame pins 466, 467 and 468, and a spring 470 is normally effective to maintain the same in its raised position shown in FIG. 22.

A pin 471 on the key 23 overlies the aforementioned link 368, the rear end of which is pivotally connected at 472 (FIG. 17) to the three armed lever 296. Accordingly, upon depression of the key 23, the forward end of the link 368 will be lowered to cause a slot 473 therein to embrace the aforementioned pin 367 on the bail 365 forming part of the toggle arrangement supporting the counter 22.

The key 23 is further provided with an ear 474 which overlies a tail 475 (FIGS. 10 and 13) extending from the arm 444 of the clutch operating bail 443. Thus, as the key 23 is depressed into its position shown in FIG. 13, the bail 443 will be rocked counterclockwise to cause engagement of the clutch and setting of the accumulator into its non-add condition.

As a machine cycle ensues under control of the key 23, the link 368, upon moving rearwardly, rocks the bail 365, drawing downwardly on the link 363 (FIG. 22) to lower the counter dial gears 371 into mesh with the rack sections 373 of the various drive racks. Also, due to lowering of the counter, zero stop lugs 380 (FIG. 3) will be located in the paths of long teeth 378a (FIGS. 3 and 27) extending laterally from the counter dials. Accordingly, the racks will drive the dials 272 toward "0" registration until arrested by the zero stops 380.

Symbol printing

In accordance with the present invention, means are provided to properly identify the various factors and results of different calculations recorded on the tape, as indicated in FIG. 15. For this purpose, a symbol section is provided in the printing mechanism, such section including a printing wheel similar to the printing wheels 106 but having symbol type located on the periphery thereof as indicated in the developed view shown in FIG. 8. The latter symbol wheel is located directly to the right of the lowermost denominational order numeral printing wheel.

The smbyol wheel is carried by a printing lever similar to the level 108 (FIG. 5) and is entrained, through an idler gear (not shown), with a gear 113a (FIG. 22), similar to the gear 113 of FIG. 5. The latter gear 113a is continuously entrained, through a pinion assembly 521, with a special symbol rack 522. The latter is mounted for fore and aft movement on guide pins, one of which is shown at 523, embraced by elongated slots as at 524 formed in the rack.

The symbol rack 522 is yieldably advanced along with the remaining drive racks 31 by the aforementioned rack drive shaft 68. To provide such a yieldable drive, a drive arm 525 is pivoted on the symbol rack at 526 and is urged upwardly by a spring 527 extending between the rack and the arm so as to normally maintain a notch 528 formed in the arm in engagement with the shaft 68. The rack is normally locked by a latch 525a which is pivoted on a frame pin 529 and coupled through a pin 50a (see also FIG. 17) to the accumulator positioning control bar 50. Thus, when the bar 50 is actuated from its normal illustrated position shown in FIG. 17, the latch 525a is rocked counterclockwise to release the symbol rack.

The smybol rack 522 is provided with a series of stop shoulders 530 cooperable with respective ones of the aforementioned pins 157 associated with the several machine control bars 13, 17 and 19. The shoulders 530 associated with the control bars 17 and 19 are carried by a slide 531 mounted on the racks 522, but for the purpose of the present disclosure the slide may be considered as part of the rack. The shoulders 530 are so spaced relative to their associated pins 157 as to enable the rack to differentially move from one to four increments depending on the particular bar depressed and thus cause appropriate symbol types on the symbol printing wheel to be registered for printing.

Means are further provided for causing the printing wheel to print a divisor symbol in response to depression of the divisor entry key 28. For this purpose, the symbol rack 522 is limited in its outward movement by engagement of a pin 532 thereon against a shoulder 533 on a blocking lever 534. This lever is provided with a vertical slot 535 embracing a frame pin 536 which permits a limited vertical as well as rocking movement of the blocking lever. A foot 537 on the blocking lever is arranged to rest on the head of a bearing stud 538 which is slideably mounted in a bearing formed in an ear 540 of a bail 541 (see also FIG. 18). The stud 538 is urged upwardly by a compression spring 542 interposed between the head of the stud and the ear 540. The stud is adjustable in such upward movement by a nut 543 threaded thereon and located under the ear 540.

The bail 541 is pivoted at 313 and has a forwardly projecting arm 546 (FIG. 18) which is held in engagement with the undersurface of a bend 547 formed in the lever assembly 435a—435b by a spring 548. When a divisor entry key 28 is depressed, the latter will rock the lever assembly downwardly into position locked by latch 437. Thus, the bail 541 will be rocked counterclockwise, raising the blocking lever 534 from its position shown in FIG. 22 to that shown in FIG. 23. A spring 549 tensioned between the blocking lever 534 and the ear 540 of the bail 541 is normally effective to urge the blocking lever 534 clockwise about the pin 536. Consequently, as the lever 534 is raised by the bail 541 about the frame pin 468, the blocking shoulder 533, thereof, will be positioned in line with the pin 532 on the rack 522. Thus, the rack will be advanced to cause the symbol printing wheel to register the divisor factor symbol 531 (FIG. 15).

Depression of the multiplicand entry key 20, on the other hand, will release the latch 437 (FIG. 18), permitting the lever assembly 435a—435b and bail 541 to return to their positions illustrated in FIGS. 18 and 22, thereby allowing the blocking lever 534 to drop below the path of travel of the pin 532. Accordingly, the symbol rack 522 will be permitted to advance to its fullest extent, until the rear end of the rack slot 524 strikes the frame pin 523, thereby causing the symbol printing wheel to advance to a position where it will print a common multiplicand-multiplier symbol 550, identifying the multiplicand factor.

The aforementioned keys 20 and 28 also predetermine the particular print symbol to be printed under control of the multiplier-quotient key 23, when such key is depressed as an incident to multiplication or division calculations. An ear 551 (FIGS. 13 and 23) formed on the stem of key 23 overlies the forward end of the blocking lever 534.

When the multiplicand key 20 has been previously depressed, the latch 437 will have released the bail 541 and lever 534 permitting the same to be either located or retained in their positions shown in FIG. 22. Now, should the key 23 be depressed to effect clearing of the counter 22 and printing of the amount registered thereby as a multiplier factor, the ear 551 will rock the blocking lever counterclockwise about the frame pin 536. However, this movement will be insufficient to position the shoulder 533 in the path of the pin 532 and, thus, the rack 522 will be permitted to advance to its fullest extent in the same manner as caused by the previous depression of the multiplicand entry key 20. Therefore, the same symbol 550 will be printed opposite the multiplier factor.

In the event that the divisor entry key 28 has previously been depressed, the bail 541 will thereafter be held in its position illustrated at FIG. 23, holding the blocking lever 534 raised and positioning the same in a location wherein its blocking shoulder 533 is located in the path of the pin 532. Now, should be key 23 be depressed to clear the counter and print the divisor factor, the ear 551 will rock the blocking lever 534 about the stud 538 as a fulcrum to thereby position a second blocking shoulder 552 in the path of the pin 532. This will limit movement of the rack 522 in a position wherein it will cause the symbol printing dial to print the quotient symbol 539.

The counter actuating mechanism disclosed herein is disclosed and claimed in the copending patent application of Chris A. Christoff, Serial Number 479,303, filed January 3, 1955 for "Calculating Machine," and since matured into Patent No. 2,840,310 issued on June 24, 1958.

What is claimed is:

1. In a calculating machine, differential actuating mechanism comprising the combination of a differential actuator, means for yieldably advancing said actuator, a blocking lever having a plurality of shoulders at one end thereof adapted to arrest said actuator in different positions, respectively, a first fulcrum means normally in a first position and adapted to fulcrum said lever intermediate the ends thereof, a second fulcrum means adapted to fulcrum said lever adjacent the end thereof opposite said shoulders, a machine control element operable to fulcrum said blocking lever about said second fulcrum means to locate one of said shoulders in the path of said actuator and to locate said first fulcrum means in a second position, and a second machine control element operable to fulcrum said blocking lever about said first fulcrum means to locate another of said shoulders in the path of said actuator only when said first fulcrum means is in said second position.

2. In a calculating machine, differential actuating mechanism comprising the combination of a differential actuator, means for yieldably advancing said actuator, a blocking lever having a plurality of shoulders at one end thereof adapted to arrest said actuator in different positions, respectively, a first fulcrum means adapted to fulcrum said blocking lever intermediate the ends thereof, a second fulcrum means adapted to fulcrum said blocking lever adjacent the end thereof opposite said shoulders, a machine control element operable to bodily pivot said blocking lever about said second fulcrum means from a position in which none of said shoulders is in the path of said actuator into a position to locate one of said shoulders in the path of said actuator and to establish a pivotal point on said blocking lever for pivotal cooperation with said first fulcrum means, and a second machine control element operable to bodily pivot said blocking lever about said first fulcrum means to locate another of said shoulders in the path of said actuator only when said pivotal point is in pivotal cooperation with said first fulcrum means.

3. In a calculating machine, differential actuating mechanism comprising the combination of a differential actuator, means for yieldably advancing said actuator, a blocking lever having a plurality of shoulders at one end thereof adapted to arrest said actuator in different positions, respectively, a first fulcrum means adapted to fulcrum said lever intermediate the ends thereof, a second fulcrum means adapted to fulcrum said lever adjacent the end thereof opposite said shoulders, a first depressible key, means controlled by said key upon depression thereof for bodily moving said blocking lever about said second fulcrum means from a position in which none of said shoulders is in the path of said actuator and to establish a pivotal point on said blocking lever for pivotal cooperation with said first fulcrum means, a second depressible key, and means controlled by said second key upon depression thereof for bodily moving said blocking lever about said first fulcrum means to locate another of said shoulders in the path of said actuator only when said pivotal point is in pivotal cooperation with said first fulcrum means.

4. In a calculating machine, differential actuating mechanism comprising the combination of a differential actuator, means for yieldably advancing said actuator, a blocking lever having a plurality of shoulders at one end thereof adapted to arrest said actuator in different positions, respectively, a first fulcrum means for fulcruming said lever intermediate the ends thereof, a second fulcrum means for fulcruming said lever adjacent the end thereof opposite said shoulder, a first depressible key, means controlled by said key upon depression thereof for bodily moving said lever about said second fulcruming means from a position in which none of said shoulders is in the path of said actuator into a position to locate one of said shoulders in said path and to establish a pivotal point on said blocking lever for pivotal cooperation with said first fulcrum means, a second depressible key, and means controlled by both said keys upon concomitant depression thereof for bodily moving said lever to position said pivotal point in pivotal cooperation with said first fulcrum means and for bodily moving said lever about said first fulcrum means to position another of said shoulders in said path.

5. In a calculating machine, differential actuating mechanism comprising the combination of a differential actuator, means for yieldably advancing said actuator, a blocking lever having a plurality of shoulders at one end thereof adapted to arrest said actuator in different positions, respectively, means normally establishing a first pivotal point for said blocking lever, a fulcrum means, a first depressible key, means controlled by said key upon depression thereof for bodily moving said blocking lever about said fulcrum means from a position in which none of said shoulders is in the path of said actuator into a position to locate one of said shoulders in said path and to establish a second pivotal point for said blocking lever, a second depressible key, and means controlled by said second key upon depression thereof for bodily moving said blocking lever about one or the other of said pivotal points, said blocking lever being ineffective when moved about said first mentioned pivotal point by said shoulders in said path and said blocking lever being effective when moved about said second mentioned pivotal point by said last mentioned means to locate a second one of said shoulders in said path.

References Cited in the file of this patent
UNITED STATES PATENTS

| | | |
|---|---|---|
| 1,018,285 | White | Feb. 20, 1912 |
| 1,527,407 | Harmsen | Feb. 24, 1925 |
| 1,568,800 | Coss | Jan. 5, 1926 |
| 2,186,265 | Norton | Jan. 9, 1940 |